US012549973B2

(12) United States Patent
Li et al.

(10) Patent No.: US 12,549,973 B2
(45) Date of Patent: Feb. 10, 2026

(54) METHODS FOR RRM MEASUREMENTS WHEN UE IS CONFIGURED WITH MULTIPLE CONCURRENT MEASUREMENT GAP PATTERNS

(71) Applicant: Apple Inc., Cupertino, CA (US)

(72) Inventors: Qiming Li, Cupertino, CA (US); Dawei Zhang, Beijing (CN); Huaning Niu, Cupertino, CA (US); Jie Cui, Cupertino, CA (US); Manasa Raghavan, Cupertino, CA (US); Xiang Chen, Cupertino, CA (US); Yang Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,141

(22) PCT Filed: Aug. 5, 2021

(86) PCT No.: PCT/CN2021/110728
§ 371 (c)(1),
(2) Date: Feb. 9, 2023

(87) PCT Pub. No.: WO2023/010378
PCT Pub. Date: Feb. 9, 2023

(65) Prior Publication Data
US 2024/0031839 A1  Jan. 25, 2024

(51) Int. Cl.
*H04W 24/08* (2009.01)
(52) U.S. Cl.
CPC .................. *H04W 24/08* (2013.01)
(58) Field of Classification Search
CPC ..... H04W 24/02; H04W 24/10; H04W 80/02; H04W 36/0094; H04W 72/541
See application file for complete search history.

(56) References Cited

U.S. PATENT DOCUMENTS 10,448,269 B2 * 10/2019 Chai ..................... H04W 24/10
11,589,323 B2 *  2/2023 Zhang ............... H04L 27/26025
(Continued)

FOREIGN PATENT DOCUMENTS

CN        107431957 A  * 12/2017  ........ H04W 36/0088
CN        115943668 A  *  4/2023  ............ H04W 24/10
(Continued)

OTHER PUBLICATIONS

F. Munier et al., "Positioning of RedCap Devices in 5G Networks," in IEEE Communications Magazine, vol. 62, No. 8, pp. 110-116, Aug. 2024, doi: 10.1109/MCOM.001.2300802 (Year: 2024).*
(Continued)

*Primary Examiner* — William D Cumming
(74) *Attorney, Agent, or Firm* — Kubota & Basol LLP

(57) ABSTRACT

Methods and systems are disclosed for a UE to perform measurements of measurement resources transmitted by a network when the UE is configured with multiple concurrent measurement gap patterns (MGPs). The measurement resources may be carried on multiple carrier frequencies. The UE may receive measurement resource configuration parameters identifying time and frequency locations of the measurement resources transmitted on the multiple carrier frequencies. The UE may receive measurement gap configuration parameters for multiple concurrent MGPs specifying measurement intervals that may be used to perform the measurements. The UE may determine a linkage between the measurement resources on a carrier frequency and one of the concurrent MGPs so that the UE may independently measure the measurement resources received on the multiple carrier frequencies using their respectively linked MGPs. The linkage may be made through information elements in the measurement resource configuration parameters or the
(Continued)

measurement gap configuration parameters containing the MGP.

16 Claims, 14 Drawing Sheets

(56) References Cited

U.S. PATENT DOCUMENTS

| | | | | |
|---|---|---|---|---|
| 12,089,083 | B2* | 9/2024 | Cheng | H04W 24/10 |
| 12,160,857 | B2* | 12/2024 | Li | H04W 24/02 |
| 2015/0215837 | A1 | 7/2015 | Yiu et al. | |
| 2018/0132124 | A1* | 5/2018 | Huang | H04W 36/0094 |
| 2019/0342801 | A1 | 11/2019 | Cui et al. | |
| 2021/0368374 | A1* | 11/2021 | Cheng | H04W 80/02 |
| 2023/0055304 | A1* | 2/2023 | Shim | H04W 72/541 |
| 2024/0031839 | A1* | 1/2024 | Li | H04W 24/10 |

FOREIGN PATENT DOCUMENTS

| | | | | |
|---|---|---|---|---|
| ID | P202403682 A | * | 5/2024 | |
| JP | 2018517322 A | * | 6/2018 | H04W 36/0094 |
| JP | 2023541739 A | * | 10/2023 | H04W 24/10 |
| KR | 20170104642 A | * | 9/2017 | H04W 72/04 |
| KR | 20230022148 A | * | 2/2023 | H04W 24/10 |
| WO | WO-2015023222 A1 | * | 2/2015 | H04W 72/044 |
| WO | WO-2016164087 A1 | * | 10/2016 | H04W 36/0088 |
| WO | WO-2016182534 A1 | * | 11/2016 | H04W 36/0094 |
| WO | WO-2020083121 A1 | * | 4/2020 | H04W 72/23 |

OTHER PUBLICATIONS

Apple, "Discussion on multiple concurrent and independent MG patterns", 3GPP TSG-RAN4 Meeting #98-e, R4-2100222, Jan. 25-Feb. 5, 2021, 5 pages.
Intel Corporation, "Discussion on pre-configured measurement gap", 3GPP TSG-RAN WG4 Meeting # 98-bis-e, R4-2109228, Apr. 12-20, 2021, 15 pages.
Moderator (MediaTek inc.), "Email discussion summary for [99-e][227] NR_MG_enh_1", 3GPP TSG-RAN WG4 Meeting #99-e R4-2108399, May 19-27, 2021, 64 pages.
Office Action received for Japanese Patent Application No. 2022-546522, mailed on Sep. 14, 2023, 6 pages (3 pages of English Translation and 3 pages of Original Document).
Decision to Grant received for Japanese Patent Application No. 2022-546522, mailed on Jan. 25, 2024, 5 pages (2 pages of English Translation and 3 pages of Original Document).
Huawei et al. "Discussion on multiple concurrent MGs", 3GPP TSG-RAN WG4 Meeting #99-e, R4-2110912, May 27, 2021, 8 pages.
International Search Report and Written Opinion received for PCT Patent Application No. PCT/CN2021/110728, mailed on Apr. 25, 2022, 7 pages.
Mediatek Inc., "Discussion on multiple concurrent and independent gap patterns", 3GPP TSG-RAN WG4 Meeting #99-e, R4-2109992, May 27, 2021, 9 pages.
Nokia, "Discussion on concurrent measurement gaps", 3GPP TSG-RAN WG4 Meeting#99, R4-2111279, May 27, 2021, 10 pages.
Qualcomm CDMA Technologies. "Views on key issues of multiple concurrent and independent MG patterns", 3GPP TSG-RAN WG4 Meeting #99-e, R4-2109729, May 27, 2021, 4 pages.
Supplementary European Search Report and Search Opinion received for European Application No. 21926042.9, mailed on Sep. 22, 2023, 11 pages.
Xiaomi, Further discussion on multiple concurrent and independent MG patterns for NR, 3GPP TSG-RAN4 Meeting #99-e, R4-2109253, May 27, 2021, 5 pages.
Search Report received for Chinese Patent Application No. 202180012268.5, mailed on Jun. 27, 2025, 4 pages (2 pages of English Translation and 2 pages of Official Copy).

* cited by examiner

| Condition | TPSS/SSS_sync_inter |
|---|---|
| No DRX | Max(600ms, 8 * Max(MGRPi, SMTC period)) * $CSSF_{inter,i}$ |
| DRX cycle ≤ 320ms | Max(600ms, Ceil(8*1.5) * Max(MGRPi, SMTC period, DRX cycle)) * $CSSF_{inter,i}$ |
| DRX cycle > 320ms | 8 * DRX cycle * $CSSF_{inter,i}$ |

FIG. 8

Solution 1: introduce new signaling from network to UE to explicitly configure each MO with an associated MGP Option 1: add indicator "GapConfig" in MO parameters

```
MeasObjectNR ::=                      SEQUENCE (
    ssbFrequency                          ARFCN-ValueNR                                              OPTIONAL,   -- Cond
    SSBorAssociatedSSB
        ssbSubcarrierSpacing              SubcarrierSpacing                                          OPTIONAL,   -- Cond
    SSBorAssociatedSSB
        smtc1                             SSB-MTC                                                    OPTIONAL,   -- Cond
    SSBorAssociatedSSB
        smtc2                             SSB-MTC2                                                   OPTIONAL,   -- Cond
    IntraFreqConnected                    
    refFreqCSI-RS                         ARFCN-ValueNR                                              OPTIONAL,   -- Cond
    CSI-RS
        referenceSignalConfig             ReferenceSignalConfig,
        absThreshSS-BlocksConsolidation   ThresholdNR                                                OPTIONAL,   -- Need R
    MGP                                   GapConfig                                                  OPTIONAL,   -- Need R
        absThreshCSI-RS-Consolidation     ThresholdNR                                                OPTIONAL,   -- Need R
        nrofSS-BlocksToAverage            INTEGER   (2..maxNrofSS-BlocksToAverage)                   OPTIONAL,   -- Need R
        nrofCSI-RS-ResourcesToAverage     INTEGER   (2..maxNrofCSI-RS-ResourcesToAverage)            OPTIONAL,   -- Need R
        quantityConfigIndex               INTEGER   (1..maxNrofQuantityConfig),
        offsetMO                          Q-OffsetRangeList,
        cellsToRemoveList                 PCI-List                                                   OPTIONAL,   -- Need N
        cellsToAddModList                 CellsToAddModList                                          OPTIONAL,   -- Need N
        blackCellsToRemoveList            PCI-RangeIndexList                                         OPTIONAL,   -- Need N
        blackCellsToAddModList            SEQUENCE  (SIZE (1..maxNrofPCI-Ranges))  OF PCI-RangeElement OPTIONAL, -- Need N
        whiteCellsToRemoveList            PCI-RangeIndexList                                         OPTIONAL,   -- Need N
        whiteCellsToAddModList            SEQUENCE  (SIZE (1..maxNrofPCI-Ranges))  OF PCI-RangeElement OPTIONAL, -- Need N
    ...
}
```

FIG. 9

GapConfig parameters of MGP associated with a MO

```
GapConfig ::=                          SEQUENCE {
    gapOffset                              INTEGER (0..159),
    mgl                                    ENUMERATED {ms1dot5, ms3, ms3dot5, ms4, ms5dot5, ms6},
    mgrp                                   ENUMERATED {ms20, ms40, ms80, ms160},
    mgta                                   ENUMERATED {ms0, ms0dot25, ms0dot5},
    ...,
    [[
    refServCellIndicator                   ENUMERATED {pCell, pSCell, mcg-FR2}           OPTIONAL
-- Cond NEDCorNRDC
    ]],
    [[
    refFR2ServCellAsyncCA-r16              ServCellIndex                                 OPTIONAL,
-- Cond AsyncCA
    mgl-r16                                ENUMERATED {ms10, ms20}                       OPTIONAL
-- Cond PRS
    ]]
}
```

FIG. 10

Solution 1: introduce new signaling from network to UE to explicitly configure each MO with an associated MGP Option 2: add a new indicator "EnhancedGapConfig" in MO paramaters

```
MeasObjectNR ::=                        SEQUENCE {
    ssbFrequency                            ARFCN-ValueNR                                                   OPTIONAL,   -- Cond
    SSBorAssociatedSSB
        ssbSubcarrierSpacing                    SubcarrierSpacing                                           OPTIONAL,   -- Cond
    SSBorAssociatedSSB
        smtc1                                   SSB-MTC                                                     OPTIONAL,   -- Cond
    SSBorAssociatedSSB
        smtc2                                   SSB-MTC2                                                    OPTIONAL,   -- Cond
    IntraFreqConnected                  --
    refFreqCSI-RS                           ARFCN-ValueNR                                                   OPTIONAL,   -- Need R
    CSI-RS
        referenceSignalConfig                   ReferenceSignalConfig
        absThreshSS-BlocksConsolidation         ThresholdNR                                                 OPTIONAL,   -- Need R
        MGP                                     EnhancedGapConfig                                           OPTIONAL,
        absThreshCSI-RS-Consolidation           ThresholdNR                                                 OPTIONAL,   -- Need R
        nrofSS-BlocksToAverage                  INTEGER   (2..maxNrofSS-BlocksToAverage)                    OPTIONAL,   -- Need R
        nrofCSI-RS-ResourcesToAverage           INTEGER   (2..maxNrofCSI-RS-ResourcesToAverage)             OPTIONAL,   -- Need R
        quantityConfigIndex                     INTEGER   (1..maxNrofQuantityConfig),
    offsetMO                                Q-OffsetRangeList,
    cellsToRemoveList                       PCI-List                                                        OPTIONAL,   -- Need N
    cellsToAddModList                       CellsToAddModList                                               OPTIONAL,   -- Need N
    blackCellsToRemoveList                  PCI-RangeIndexList                                              OPTIONAL,   -- Need N
    blackCellsToAddModList                  SEQUENCE (SIZE (1..maxNrofPCI-Ranges))   OF  PCI-RangeElement   OPTIONAL,   -- Need N
    whiteCellsToRemoveList                  PCI-RangeIndexList                                              OPTIONAL,   -- Need N
    whiteCellsToAddModList                  SEQUENCE (SIZE (1..maxNrofPCI-Ranges))   OF  PCI-RangeElement   OPTIONAL,   -- Need N
    ...
}
```

FIG. 11

GapConfig parameters include an information element Gap-ID to indicate ID of the MGP

```
GapConfig ::=                    SEQUENCE {
    gapOffset                        INTEGER (0..159),
    mgl                              ENUMERATED {ms1dot5, ms3, ms3dot5, ms4, ms5dot5, ms6},
    mgrp                             ENUMERATED {ms20, ms40, ms80, ms160},
    mgta                             ENUMERATED {ms0, ms0dot25, ms0dot5},
    ...,
    [[
    refServCellIndicator             ENUMERATED { pCell, pSCell, mcg-FR2 }          OPTIONAL
    ~ Cond NEDCorNRDC
    ]],
    [[
    refFR2ServCellAsyncCA-r16        ServCellIndex                                   OPTIONAL,
    ~ Cond AsyncCA
    mgl-r16                          ENUMERATED {ms10, ms20}                         OPTIONAL
    -- Cond PRS
    ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
    │ Gap-ID                         ENUMERATED {0, 1, 2, 3}                        │
    └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
    ]]                                                         Gap-ID
}

EnhancedGapConfig
```

FIG. 12

Solution 2: introduce new signaling from network to UE to explicitly configure each MGP with an associated MO

```
MeasGapConfig ::=        SEQUENCE {
    gapFR2                   SetupRelease {GapConfig}    OPTIONAL,
    ...,
    [[
    gapFR1                   SetupRelease{GapConfig}    OPTIONAL,
    gapUE                    SetupRelease{GapConfig}    OPTIONAL,
    | measObjectToAddModList                            OPTIONAL,  |
    ]]
} measObjectToAddModList    is the existing IE:

MeasConfig ::=        SEQUENCE {
    measObjectToRemoveList              MeasObjectToRemoveList      OPTIONAL,    -- Need N
    measObjectToAddModList              MeasObjectToAddModList      OPTIONAL,    -- Need N
    reportConfigToRemoveList            ReportConfigToRemoveList    OPTIONAL,    -- Need N
    reportConfigToAddModList            ReportConfigToAddModList    OPTIONAL,    -- Need N
    measIdToRemoveList                  MeasIdToRemoveList          OPTIONAL,    -- Need N
    measIdToAddModList                  MeasIdToAddModList          OPTIONAL,    -- Need N
    s-MeasureConfig                     CHOICE {
        ssb-RSRP                            RSRP-Range,
        csi-RSRP                            RSRP-Range
    }                                                                OPTIONAL,    -- Need M
    quantityConfig                      QuantityConfig              OPTIONAL,    -- Need M
    measGapConfig                       MeasGapConfig               OPTIONAL,    -- Need M
    measGapSharingConfig                MeasGapSharingConfig        OPTIONAL,    -- Need M
    ...,
    [[
    interFrequencyConfig-NoGap-r16      ENUMERATED {true}           OPTIONAL     -- Need R
    ]]
}
```

FIG. 13

METHODS FOR RRM MEASUREMENTS WHEN UE IS CONFIGURED WITH MULTIPLE CONCURRENT MEASUREMENT GAP PATTERNS

RELATED APPLICATIONS

The present application is the national phase of International Application No. PCT/CN2021/110728, filed on Aug. 5, 2021 and the disclosure of which is hereby incorporated herein by reference in its entirety.

FIELD OF INVENTION

This invention relates generally to the field of wireless communication, and more particularly, to systems and methods for wireless communication devices to make measurements of resources transmitted by a communication network for the purpose of radio resource management when the wireless communication devices are configured with multiple concurrent measurement patterns. Other aspects are also described.

BACKGROUND OF THE INVENTION

In a wireless communications network, a user equipment (UE) may communicate with a base station of the network by establishing a radio link between the UE and the base station. In the 5G (New Radio or NR) or 4G (LTE) wireless network, a UE may monitor the quality of the radio link by measuring reference signals periodically transmitted by the serving base station on an operating channel, or on other channels transmitted by the serving base station or neighboring base stations of the network. The quality of the radio link may be affected by the distance of the UE from the base stations, the number of UEs sharing the radio spectrum, interference, environmental conditions, etc. The UE may report the measurement results to the serving base station for the network to determine whether to switch the radio link to a different beam, a different frequency channel, a different base station, or a different network as part of radio resource management (RRM) function performed by the network. The network may configure the UE with measurement gap patterns to specify intervals during which the reference signals may be measured.

In earlier versions of UE, the UE may be configured with one only measurement gap pattern (MGP) per frequency range (e.g., one MGP for the frequency range≤6 GHz and one MGP for the frequency range>6 GHz). As such, the requirements for RRM measurements are designed based on the assumption that there is only one MGP in each frequency range. More recently, motivated by a desire to enhance the radio link and positional accuracy of UE due to increased user mobility, enhancements to the RRM measurement may allow the network to configure the UE with multiple concurrent MGPs. A UE that supports the enhancement may make independent measurements on multiple operating channels within a frequency range for a more accurate assessment of the channel qualities. The UE may also more flexibly measure positioning reference signals (PRS) to enhance positional awareness. The network may configure the UE with a number of concurrent and independent MGPs that are active at any time. The multiple concurrent MGPs allow independent measurements of the reference signals on a number of different operating channels but also introduce complexities in the design of the RRM measurements. It is desired to reduce the complexities of the measurement behavior and RRM requirements of the UE when configured with multiple concurrent MGPs.

SUMMARY OF THE DESCRIPTION

Methods and systems are disclosed for a UE to perform RRM measurements of measurement resources (e.g., reference or synchronization signals) transmitted by the 5G/LTE network when the UE is configured by the network with multiple concurrent MGPs. The measurement resources may be carried on multiple carrier frequencies of radio beams transmitted from a serving base station or a neighboring base station of the same or a different system. The UE may receive measurement resource configuration parameters identifying time and frequency locations of the measurement resources transmitted on the multiple carrier frequencies. The UE may receive measurement gap configuration parameters for multiple concurrent MGPs specifying measurement intervals that may be used to perform the RRM measurement of the measurement resources. The UE may determine a linkage or an association between the measurement resources on a carrier frequency and one of the concurrent MGPs so that the UE may independently perform the RRM measurements of the measurement resources received on the multiple carrier frequencies using their respectively linked MGPs.

In one aspect, the measurement resources on each carrier frequency may be covered by only one MGP. The measurement intervals specified by the one MGP may be used by the UE to measure all or a subset of the measurement resources on the associated carrier frequency. In one aspect, a MGP may be used to measure the measurement resources on multiple carrier frequencies. For example, the measurement resources on a first carrier frequency may be covered by a first MGP and the measurements resources on a second and third carrier frequencies may be covered by a second MGP. The UE may use the first MGP to perform the RRM measurements on the first carrier frequency and use the second MGP to perform the RRM measurements on the second and third carrier frequencies. The multiple concurrent MGPs may be disjoint in time so that their measurements intervals may not overlap.

In one aspect, the measurement resources on a carrier frequency may be covered by more than one MGPs. For example, the measurement resources on a first carrier frequency may be covered by a first MGP; the measurement resources on a second carrier frequency may be covered by a second MGP; and the measurement resources on a third carrier frequency may be covered by the first MGP or the second MGP. The UE may determine whether the third carrier frequency is covered by the first MGP or the second MGP based on a linkage or an association between the measurement resource configuration parameters identifying the third carrier frequency and the measurement gap configuration parameters for either of the two MGPs. The UE may use the first MGP to perform the RRM measurements on the first carrier frequency, use the second MGP to perform the RRM measurements on the second carrier frequency, and use either the linked first MGP or the linked second MGP to perform the RRM measurements on the third carrier frequency.

In one aspect, to determine the linkage between the measurement resources on a carrier frequency with one of the multiple concurrent MGPs, the measurement resource configuration parameters identifying the carrier frequency or the measurement gap configuration parameters for the MGPs may contain information for the UE to make such a linkage. In one aspect, the measurement resource configuration parameters may contain an information element that references the measurement gap configuration parameters. The UE may use the information element to link a current state of the MGP contained in the measurement gap configuration parameters to the measurement resources on the carrier frequency specified by the measurement resource configuration parameters. In one aspect, the information element may reference a specific MGP among multiple sets of measurement gap configuration parameters. The network may pre-configure the UE with multiple sets of measurement gap configuration parameters to correspond to the multiple concurrent MGPs. The MGPs corresponding to the multiple sets of measurement gap configuration parameters may be uniquely identified. The UE may link the MGP referenced by the information element to the measurement resources on the carrier frequency specified by the measurement resource configuration parameters.

In one aspect, the measurement gap configuration parameters providing the MGP may contain an information element that references the measurement resource configuration parameters identifying the carrier frequency to be linked. The UE may link the measurement resources on the carrier frequency specified by the referenced measurement resource configuration parameters to the MGP. In one aspect, the information element may reference multiple sets of measurement resource configuration parameters so that the same MGP may be used to perform the RRM measurements on multiple carrier frequencies.

BRIEF DESCRIPTION OF THE DRAWINGS

The present invention is illustrated by way of example and not limitation in the figures of the accompanying drawings in which like references indicate similar elements.

FIG. 8 shows the delay in performing measurements of the measurement resources on a carrier frequency using a MGP as a function of the measurement gap repetition period (MGRP) and the number of carrier frequencies sharing the MGP, according to one aspect of the disclosure.

FIG. 9 shows the measurement object containing an information element MGP that references the measurement gap configuration parameters GapConfig to link the MGP contained in the GapConfig to the measurement resources on the carrier frequency specified by the measurement object, according to one aspect of the disclosure.

FIG. 10 shows the measurement gap configuration parameters GapConfig containing the MGP that may be linked to a measurement object, according to one aspect of the disclosure.

FIG. 11 shows the measurement object containing an information element MGP that references the measurement gap configuration parameter EnhancedGapConfig to link a MGP identified by a unique identifier to the measurement resources on the carrier frequency specified by the measurement object, according to one aspect of the disclosure.

FIG. 12 shows the measurement gap configuration parameter EnhancedGapConfig identifying a MGP identified by an identifier Gap-ID, according to one aspect of the disclosure.

FIG. 13 shows the measurement gap configuration parameters MeasGapConfig containing an information element measObjectToAddModList that references measurement objects to link the MGP contained in the MeasGapConfig to the measurement resources on the carrier frequency specified by the measurement objects, according to one aspect of the disclosure.

DETAILED DESCRIPTION

Figure 1:
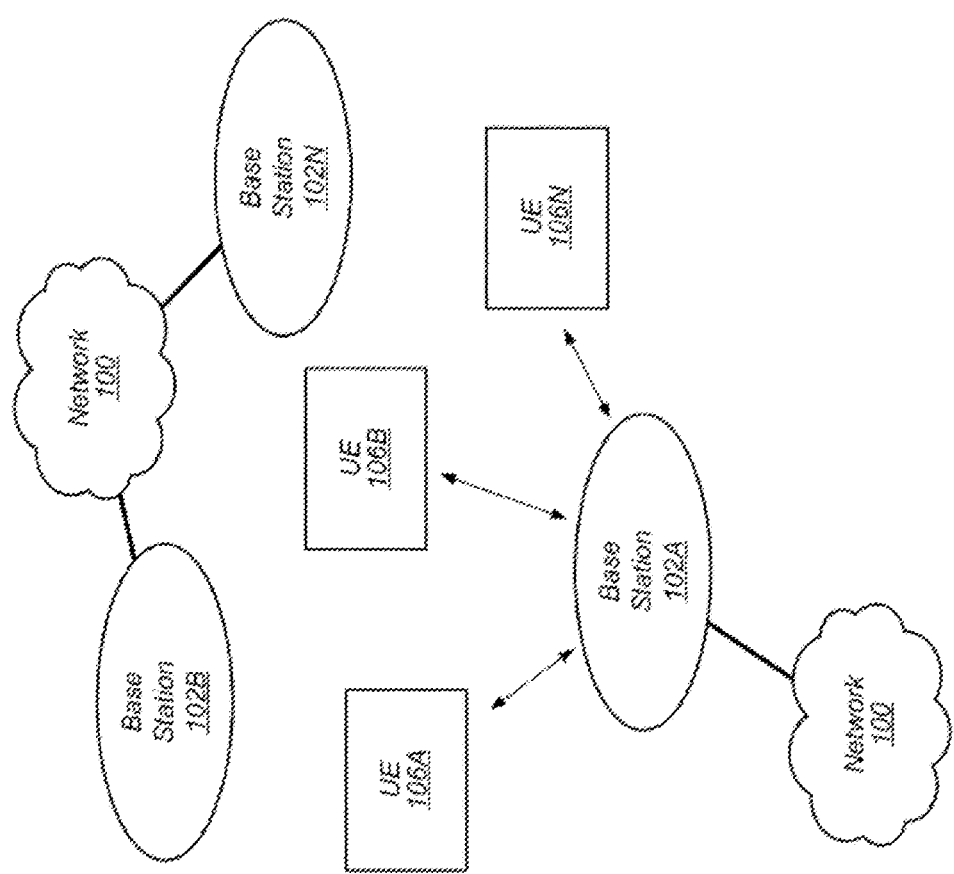
FIG. 1 illustrates an example wireless communication system according to one aspect of the disclosure.

Methods and systems are disclosed for a UE to use multiple concurrent MGPs to perform independent RRM measurements of measurements resources transmitted by the 5G/LYE network on multiple carrier frequencies. The measurement resources used for RRM measurements may be the synchronization signal/physical broadcast channel (SS/PBCH) blocks, the channel state information reference signal (CSI-RS) resources, positioning reference signal (PRS) or other reference signals from other systems such as cell reference signal (CRS) in LTE and so on. The UE may measure the measurement resources to report the channel quality of the multiple carrier frequencies, for beam management and for connected mode mobility procedure. The UE may receive measurement resource configuration parameters, also referred to as measurement objects, that identify the time and frequency locations of the SS/PBCH blocks and CSI-RS resources to be measured for the multiple carrier frequencies. The UE may receive measurement gap configuration parameters for the multiple concurrent MGPs specifying the measurement intervals that may be used to measure the measurement resources on the multiple carrier frequencies. The UE may link or associate a measurement object specifying the timing of transmissions of the measurement resources on a carrier frequency with one of the concurrent MGPs. The MGP linked to the measurement object may overlap with all or a subset of the measurement resources specified by the measurement object so that the UE may measure the RRNI measurement for the carrier frequency independently of the RRNI measurement for other carrier frequencies. The following description mainly uses the SS/PBCH blocks as examples of the measurement resources, but the techniques is equally applicable to CSI-RS resources, positioning reference signal (PRS) and other reference signals from other systems such as cell reference signal (CRS) in LTE and so on.

In one aspect, to link a measurement object to a MGP, an information element may be added to the measurement object to associate the MGP to be linked with the measurement object. The information element may reference the measurement gap configuration parameters so that a current state of the MGP contained in the measurement gap configuration parameters may be linked.

In one aspect, the network may configure the UE with the measurement gap configuration parameters containing the desired MGP. The network may then configure the UE with the measurement object specifying the information element for the UE to create the linkage or association between the measurement object and the desired MGP.

In one aspect, the measurement object may use the information element to explicitly identify the MGP to be linked. The network may configure the UE with multiple sets of measurement gap configuration parameters containing the multiple concurrent MGPs. Each set of measurement gap configuration parameters may contain an identifier to uniquely identify the MGP contained therein. The network may then configure the UE with the measurement object specifying the information element to reference the desired MGP to be linked through the identifier. The UE may create the linkage between the measurement object and the desired MGP based on the information element.

In one aspect, to link a measurement object to a MGP, an information element may be added to the measurement gap configuration parameters containing the MGP to associate the measurement object with the MGP. The network may configure the UE with the measurement gap configuration parameters containing the MGP. The measurement gap configuration parameters may include the information element to reference one or more measurement objects to be linked to the MGP contained therein. The UE may create the linkage between the one or more objects and the MGP based on the information element.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
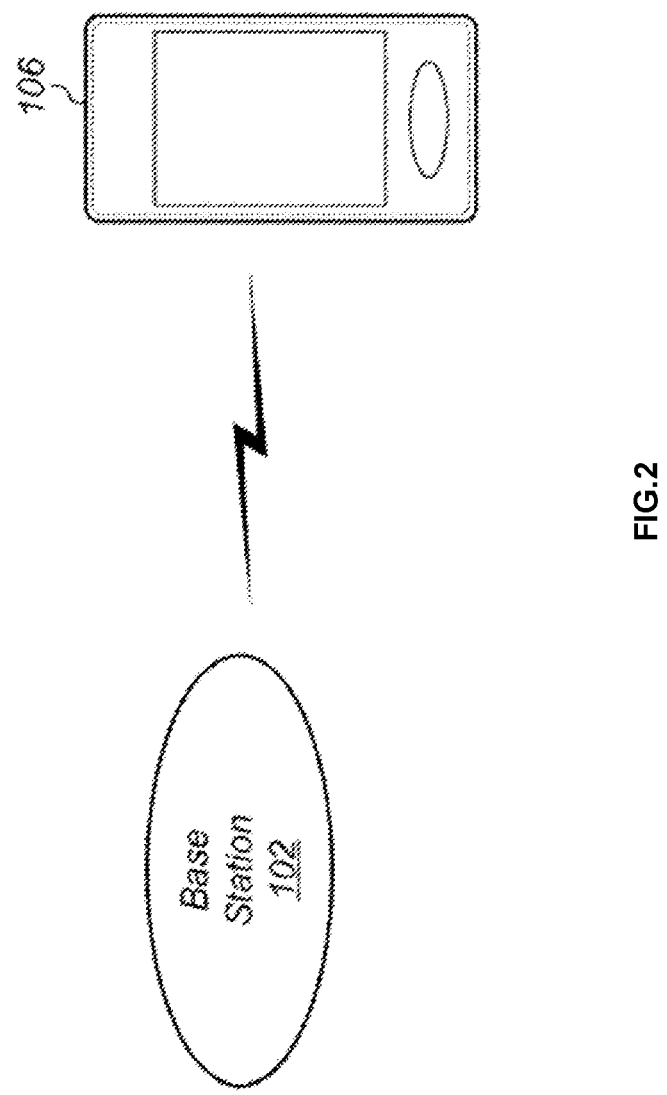
FIG. 2 illustrates user equipment in direct communication with a base station (BS) according to one aspect of the disclosure.

FIG. 2 illustrates a UE 106 in direct communication with a base station 102 through uplink and downlink communications according to one aspect of the disclosure. The UE 106 may be a device with cellular communication capability such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
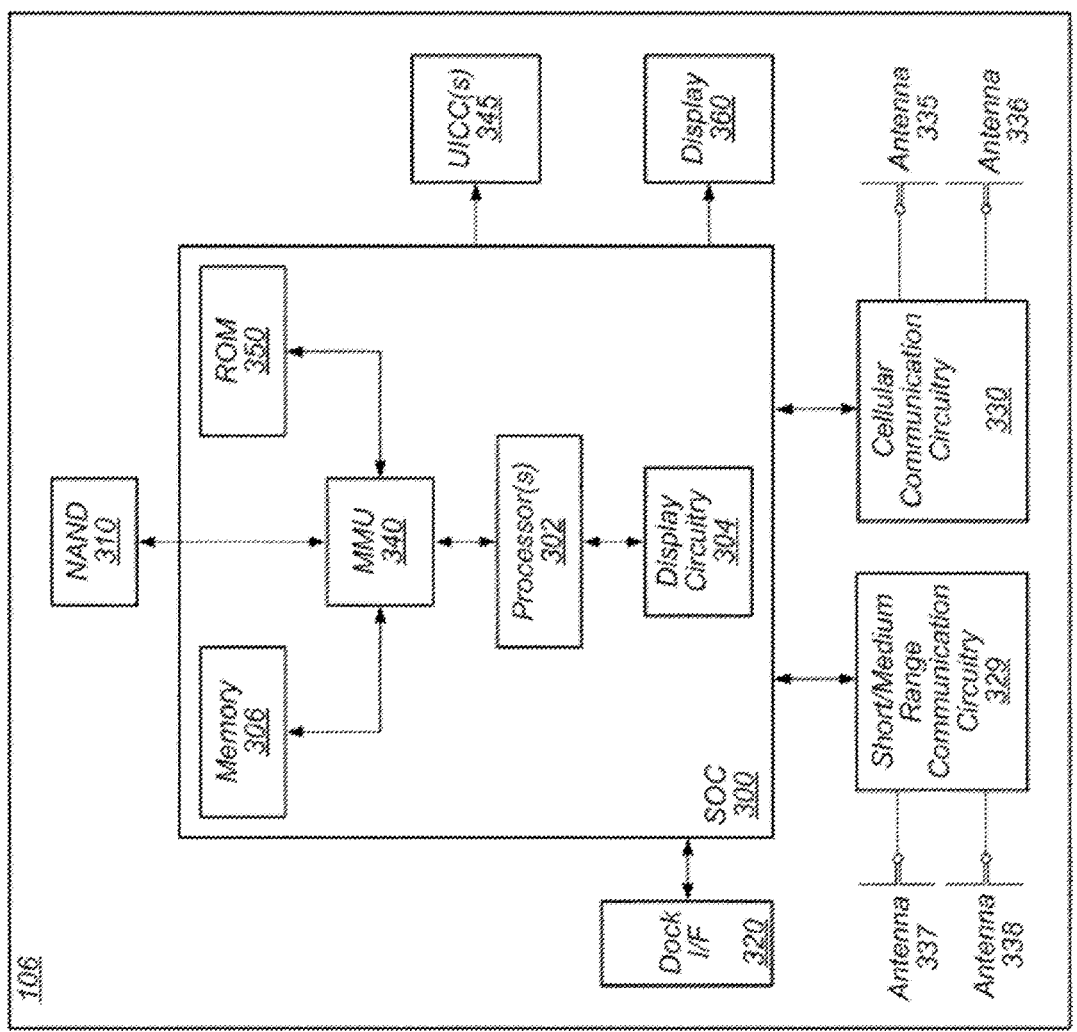
FIG. 3 illustrates an example block diagram of a UE according to one aspect of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs.

For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
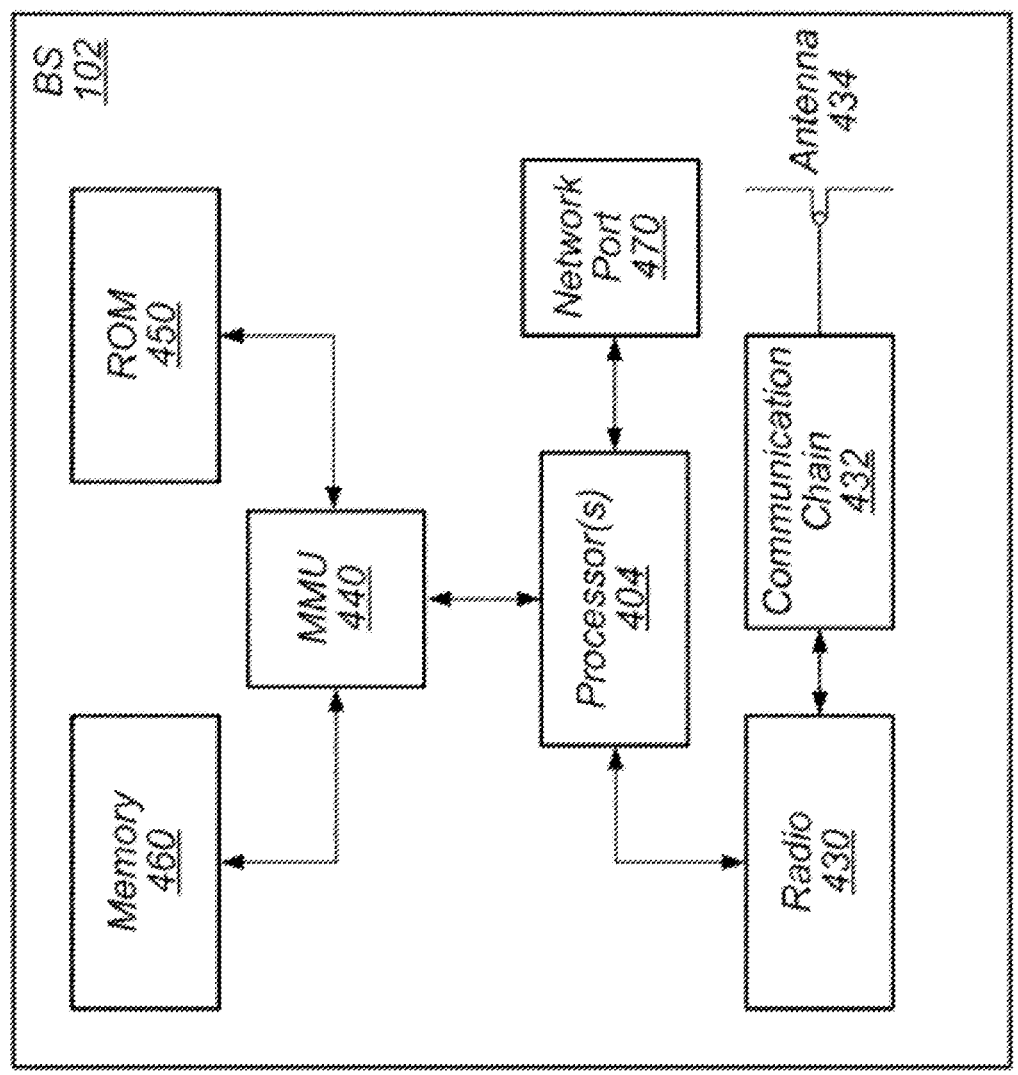
FIG. 4 illustrates an example block diagram of a BS according to one aspect of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UEs 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UEs 106. In some cases, the network port 470 may couple to a telephone network via the core network, and/or the core network may provide a telephone network (e.g., among other UEs serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UEs 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
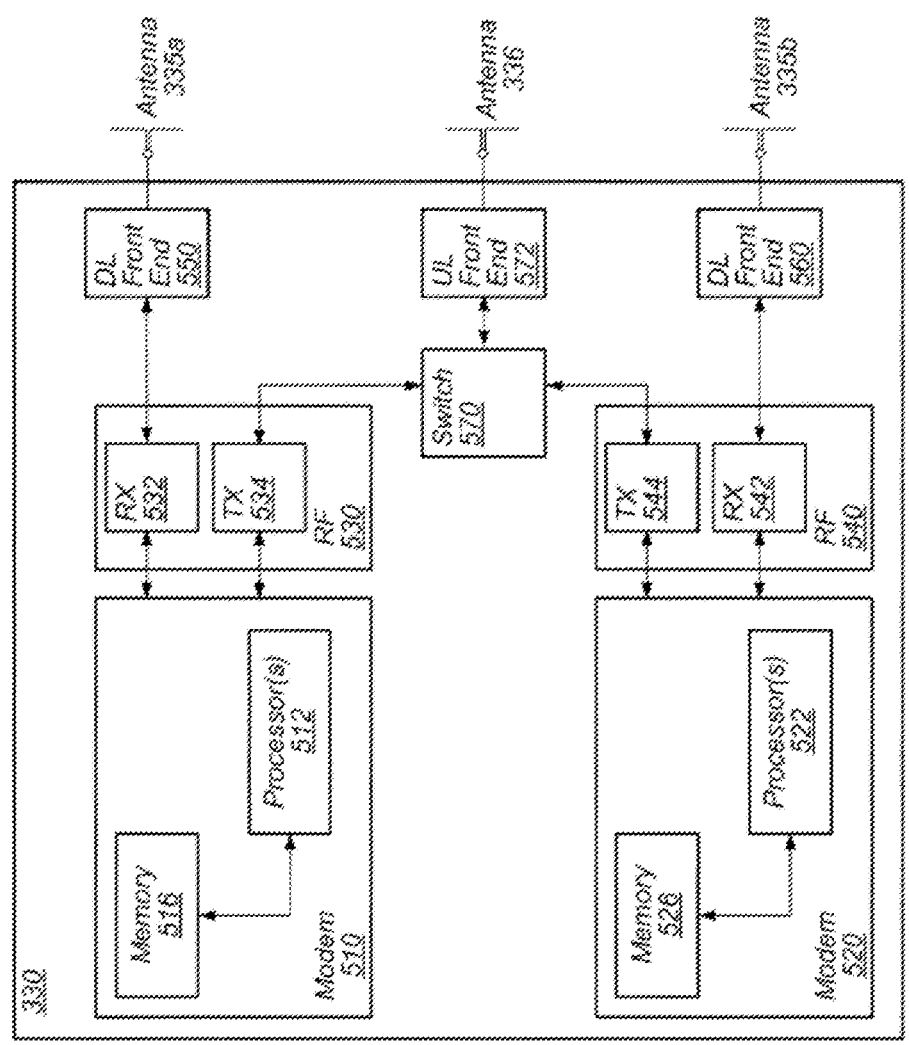
FIG. 5 illustrates an example block diagram of cellular communication circuitry according to one aspect of the disclosure.

FIG. 5 illustrates an example simplified block diagram of cellular communication circuitry according to one aspect of the disclosure. It is noted that the block diagram of the cellular communication circuitry of FIG. 5 is only one example of a possible cellular communication circuit.

According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530,

532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

A UE implementing the cellular communication circuitry 330 may perform and report RRM measurements of measurement resources such as SS/PBCH blocks, CSI-RS resources, PRS or other reference signals from other systems such as CRS in LTE transmitted by the base station 102 on multiple carrier frequencies or operating channels. The UE may receive from the base station 102 measurement resource configuration parameters, referred to as measurement objects (MOs), that identify the time and frequency locations of the SS/PBCH blocks, CSI-RS or other resources to be measured for the multiple carrier frequencies. The UE may receive measurement gap configuration parameters containing multiple concurrent MGPs specifying the measurement intervals that may be used to measure the SS/PBCH blocks, CSI-RS or other resources on the multiple carrier frequencies.

Figure 6:
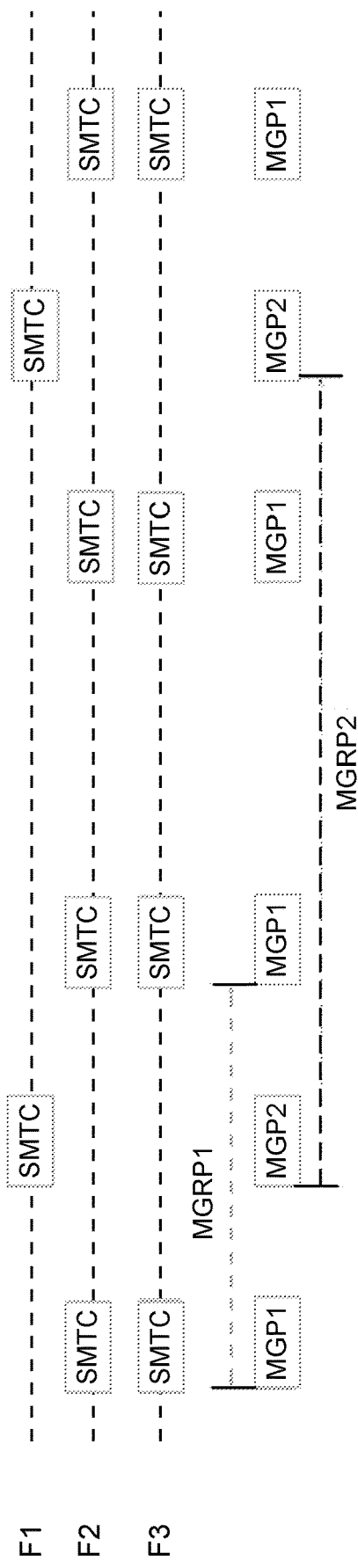
FIG. 6 depicts a scenario in which each measurement object identifying the timing of the measurement resources is covered by only one MGP, according to one aspect of the disclosure.

FIG. 6 depicts a scenario in which each measurement object identifying the timing of the measurement resources is covered by only one MGP, according to one aspect of the disclosure. A UE may receive SS/PBCH blocks on three carrier frequencies, denoted F1, F2, and F3. The UE may be provided with configuration information regarding the timing of the SS/PBCH transmissions on each carrier frequency to be covered by one of the concurrent MGPs. The information may be provided by the SS/PBCH block measurement timing configuration (SMTC) configured as part of the measurement object within an RRC Connection Reconfiguration message. The SMTC may define a period, an offset and a duration of the SS/PBCH blocks.

The MGPs may also define a period, an offset and a duration of the measurement intervals, collectively referred to as measurement gaps, used to measure the SS/PBCH blocks within the SMTC on each carrier frequency. The period of the measurement gaps may be provided by the measurement gap repetition period (MGRP). The MGRP may be the period of the SS/PBCH blocks defined by the SMTC or a multiple of the period. Two MGPs are shown, MGP1 and MGP2. The MGRP of the two MGPs are MGRP1 and MGRP2, respectively.

In FIG. 6, each MO is covered by only one MGP because the SS/PBCH blocks defined by the SMTC on each carrier frequency are measured using only one MGP. For example, the MO on F1 is only covered by MGP2 as the period of the SS/PBCH blocks defined by the SMTC on F1 is the same as the MGRP2 so that the UE may measure the SS/PBCH blocks on F1 using the measurement gaps defined by MGP2. The MO on F2 is only covered by MGP1 and the MO on F3 is also only covered by MGP1. The UE may measure the SS/PBCH blocks on F2 and F3 using the measurement gaps defined by MGP1. The UE may make the measurements using MGP1 and MGP2 independently. MGP1 and MGP2 are fully non-overlapped because all measurement gaps are disjoint in time.

The SS/PBCH blocks may include the primary synchronization signal (PSS) and the secondary synchronization signal (SSS). The UE may detect the PSS/SSS and measure the received power of the PSS/SSS on the three carrier frequencies when the UE measures the SS/PBCH blocks using the measurement gaps determined by the corresponding MGP. The latency associated with the measurements may include the PSS/SSS detection delay and time index detection delay. The PSS/SSS detection delay and time index detection delay for each carrier frequency are also determined by the corresponding MGP. For example, the carrier specific scaling factor (CSSF) used to calculate the PSS/SSS detection delay for a carrier frequency may be determined by the total carrier frequencies that are measured using the corresponding MGP for the carrier frequency. In FIG. 6, CSSF for F1 is 1 because the corresponding MGP2 is used to make the measurements only on F1. CSSF for F2 and F3 is 2 because the corresponding MGP1 is used to make the measurements on both F2 and F3.

Figure 7:
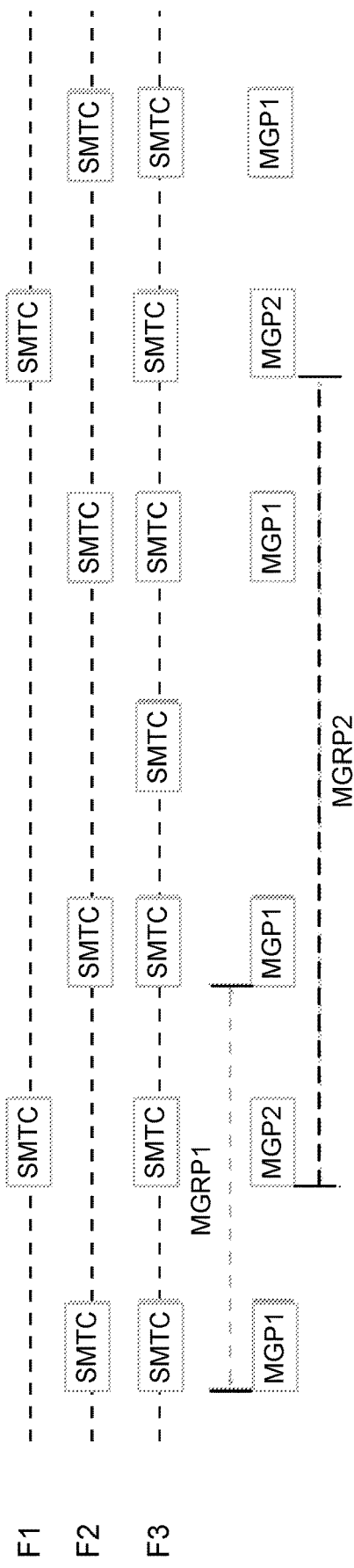
FIG. 7 depicts a scenario in which a measurement object identifying the timing of the measurement resources may be covered by multiple MGPs, according to one aspect of the disclosure.

FIG. 7 depicts a scenario in which a measurement object identifying the timing of the measurement resources may be covered by multiple MGPs, according to one aspect of the disclosure. For example, the SMTC of MO on F1 is only covered by MGP2 and the SMTC of MO on F2 is only covered by MGP1 as in FIG. 6. However, the SMTC of MO on F3 may be covered by MGP1 and MGP2 because the UE may measure the SS/PBCH blocks defined by the SMTC on F3 using the measurement gaps defined by MGP1 or MGP2. The UE may determine whether the SMTC of MO on F3 is covered by MGP1 or MGP2 based on a linkage or association between MO on F3 and either MGP1 or MGP2.

If the SMTC of MO on F3 is covered by MGP1, then MGP1 is shared between the MO of F2 and the MO of F3 because the UE may measure the SS/PBCH blocks on F2 and F3 using the measurement gaps defined by MGP1. In this case, for the MO of F1, the MGRP used to measure the SS/PBCH blocks on F1 is MGRP2 and the CSSF used to calculate the PSS/SSS detection delay is 1 because the corresponding MGP2 is used to make the measurements only on F1. For the MO of F2 and the MO of F3, the MGRP used to measure the SS/PBCH blocks on F2 and F3 is MGRP1 and the CSSF is 2 because the corresponding MGP1 is used to make the measurements on both F2 and F3.

If the SMTC of MO on F3 is covered by MGP2, then MGP2 is shared between the MO of F1 and the MO of F3 because the UE may measure the SS/PBCH blocks on F1 and F3 using the measurement gaps defined by MGP2. In this case, for the MO of F1 and F3, the MGRP used to measure the SS/PBCH blocks on F1 and F3 is MGRP2 and the CSSF used to calculate the PSS/SSS detection delay is 2 because the corresponding MGP2 is used to make the measurements on both F1 and F3. For the MO of F2, the MGRP used to measure the SS/PBCH blocks on F2 is MGRP1 and the CSSF is 1 because the corresponding MGP1 is used the make the measurements only on F2.

FIG. 8 shows the latency in performing measurements of the measurement resources on a carrier frequency, specifically the PSS/SSS detection delay, using the corresponding MGP as a function of the MGRP and the number of carrier frequencies sharing the MGP, according to one aspect of the disclosure. The number of carrier frequencies sharing the MGP is CSSF. FIG. 8 shows that the PSS/SSS detection delay may be a condition of the discontinuous reception (DRX) cycle. The PSS/SSS detection delay associated with measuring the SS/PBCH blocks on a carrier frequency may be a function of the MGRP and the CSSF as determined by the corresponding MGP for the carrier frequency.

As discussed, when the SMTC of MO on a carrier frequency is capable of being covered by multiple candidate MGPs, the UE may determine whether the SMTC of MO on the carrier frequency is covered by a specific MGP based on a linkage or association between the MO and the specific MGP. In one aspect, an information element may be added to the MO to associate the MGP to be linked with MO. In one aspect, an information element may be added to the measurement gap configuration parameters containing the MGP to associate the MO with the MGP.

FIG. 9 shows the MO containing an information element MGP that references the measurement gap configuration parameters GapConfig to link the MGP contained in the GapConfig to the SS/PBCH blocks on the carrier frequency specified by the MO, according to one aspect of the disclosure. The MO MeasObjectNR may specify the time and frequency locations of the SS/PBCH blocks and CSI-RS resources such as the carrier frequency and the SMTC. The measurement gap configuration parameters GapConfig may specify the measurement gaps of one of the multiple concurrent MGP used to measure the SS/PBCH blocks. The information element MGP may reference the GapConfig so that a current state of the MGP contained in the GapConfig may be linked to the MO MeasObjectNR.

In one aspect, the network may configure the UE with the GapConfig containing the desired MGP to be linked to the MO. The network may then configure the UE with the MO MeasObjectNR specifying the information element MGP referencing GapConfig for the UE to create the linkage or association between the measurement object MeasObjectNR and the desired MGP. The order of the configurations of the GapConfig and MeasObjectNR may be interchangeable. For example, in one aspect, the network may configure the UE with the MO MeasObjectNR specifying the information element MGP referencing GapConfig, and then configure the UE with the GapConfig containing the desired MGP to be linked to the MO for the UE to create the linkage.

FIG. 10 shows the measurement gap configuration parameters GapConfig containing the MGP that may be linked to a measurement object, according to one aspect of the disclosure. GapConfig may contain measurement gaps of the MGP such as the period of the measurement gaps MGRP, the measurement gap offset gapOffset and the duration of the measurement gaps MGL, used to measure the SS/PBCH blocks within the SMTC on a carrier frequency defined by a linked MO.

In one aspect, the MO may use an information element to explicitly identify the MGP to be linked. FIG. 11 shows the MO containing an information element MGP that references the measurement gap configuration parameter EnhancedGapConfig to link a MGP identified by a unique identifier to the SS/PBCH blocks on the carrier frequency specified by the MO, according to one aspect of the disclosure.

The network may configure the UE with multiple sets of GapConfig containing the multiple concurrent MGPs. Each set of GapConfig may contain an identifier to uniquely identify the MGP contained therein. The network may then configure the UE with the MO MeasObjectNR specifying the information element MGP to reference one of the multiple concurrent MGP to be linked through the identifier. For example, the information element MGP may reference the measurement gap configuration parameter EnhancedGapConfig, which may be used to link to one of the multiple sets of GapConfig containing the MGP to be linked.

FIG. 12 shows the measurement gap configuration parameter EnhancedGapConfig identifying a MGP identified by an identifier Gap-ID, according to one aspect of the disclosure. Each of the multiple sets of GapConfig containing the multiple concurrent MGPs may contain an information element Gap-ID to uniquely identify the MGP contained therein. For example, the information element for the GapConfig specifying the MGP1 and MGP2 of FIGS. 6 and 7 may contain an information Gap-ID of 1 and 2, respectively. The measurement gap configuration parameter EnhancedGapConfig referenced by the MO may specify a Gap-ID of 1 or 2 to link MGP1 or MGP2 to the MO.

FIG. 13 shows the measurement gap configuration parameters MeasGapConfig containing an information element measObjectToAddModList that references MO to link the MGP contained in the MeasGapConfig to the SS/PBCH blocks on the carrier frequency specified by the MO, according to one aspect of the disclosure. The measurement gap configuration parameters MeasGapConfig may reference GapConfig containing the measurement gaps of a MGP. The information element measObjectToAddModList may reference one or more MOs to be linked to be MGP. The information element measObjectToAddModList may be the same as that in the measurement configuration structure MeasConfig used by the network to add a list of MO for RRM measurements.

Thus, FIG. 13 shows an embodiment in which an information element may be added to the measurement gap configuration parameters containing the MGP to associate a MO with the MGP. FIGS. 9-12 show embodiments in which an information element may be added to a MO to associate a MGP with the MO. In one aspect, the UE measurement behavior and corresponding RRNI measurement requirements may be the same for these embodiments.

Figure 14:
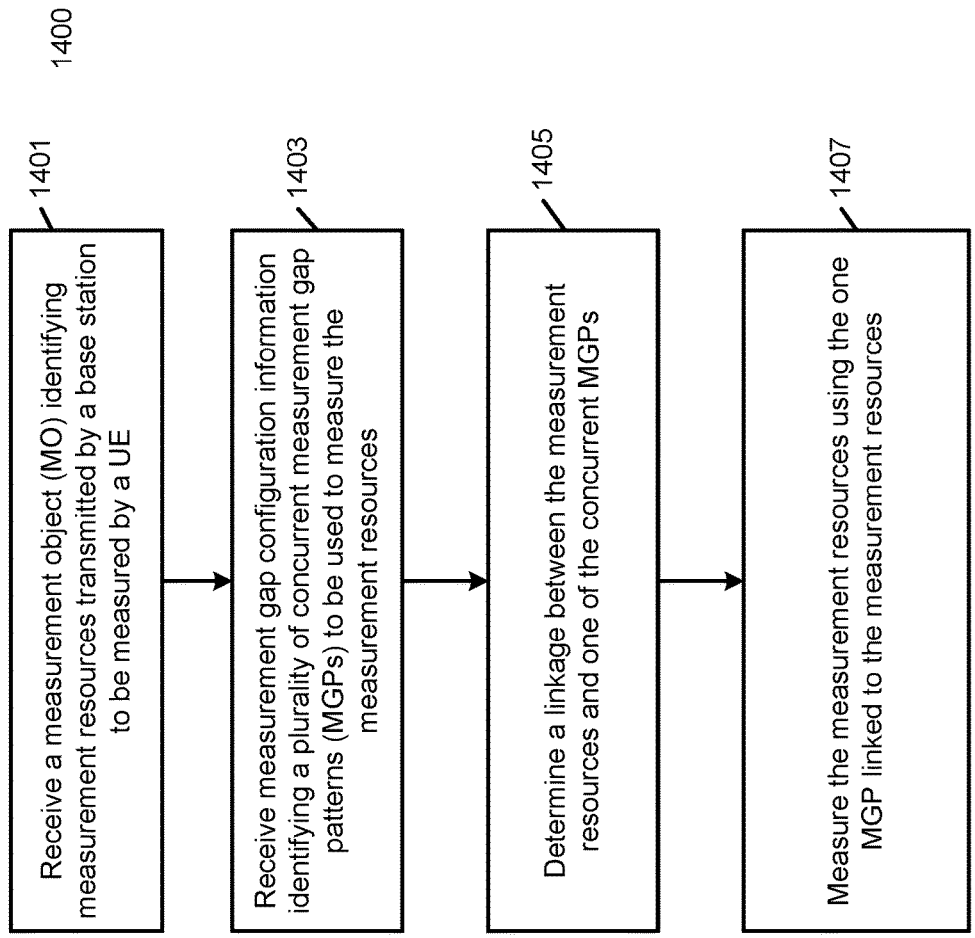
FIG. 14 depicts a flow diagram of a method for a UE to perform RRM measurements of measurement resources transmitted by a network when the UE is configured by the network with multiple concurrent MGPs, according to one aspect of the disclosure.

FIG. 14 depicts a flow diagram of a method 1400 for a UE to perform RRNI measurements of measurement resources transmitted by a network when the UE is configured by the network with multiple concurrent MGPs, according to one aspect of the disclosure. Method 1400 may be practiced by the UE of FIGS. 1, 2, 3, and 5.

In operation 1401, the UE receives from a communication network a MO identifying measurement resources transmitted by the communication network on a carrier frequency within a frequency range.

In operation 1403, the UE receives from the communication network measurement gap configuration parameters providing multiple concurrent MGPs capable of being used to measure the measurement resources. In one aspect, the UE may receive from the communication network the MO and the measurement gap configuration parameters in any order or simultaneously.

In operation 1405, the UE determines a linkage between the measurement resources on the carrier frequency and a MGP selected from the multiple concurrent MGPs.

In operation 1407, the UE measures the measurement resources received from the communication network on the carrier frequency using the linked MGP.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A user equipment (UE), comprising:
   at least one antenna;
   at least one radio, wherein the at least one radio is configured to communicate with a communication network using the at least one antenna; and
   at least one processor coupled to the at least one radio, wherein the at least one processor is configured to perform operations comprising:
      receiving, from the communication network, a measurement object (MO) identifying measurement resources transmitted by the communication network on a carrier frequency within a frequency range;
      receiving, from the communication network, measurement gap configuration parameters providing a plurality of concurrent measurement gap patterns (MGPs) to measure the measurement resources;
      determining, based on an information element comprised in the MO, a linkage between the measurement resources on the carrier frequency and a linked MGP selected from the plurality of concurrent MGPs, wherein the information element associates the measurement resources on the carrier frequency with the linked MGP; and measuring the measurement resources received from the communication network on the carrier frequency using the linked MGP.

2. The UE of claim 1, wherein the MO comprises a first timing configuration identifying periodic transmissions of the measurement resources by the communication network on the carrier frequency.

3. The UE of claim 2, wherein the linked MGP comprises a second timing configuration identifying periodic measurement intervals overlapping with a subset of the periodic transmissions of the measurement resources received by the UE on the carrier frequency.

4. The UE of claim 1, wherein the linked MGP is also used to measure the measurement resources received from the communication network on a second carrier frequency.

5. The UE of claim 1, wherein the linked MGP is a current state of the plurality of concurrent MGPs provided by the measurement gap configuration parameters when the MO is received.

6. The UE of claim 1, wherein the plurality of concurrent MGPs are disjoint in time.

7. The UE of claim 1, wherein the plurality of concurrent MGPs are partially or fully overlapping in time.

8. The UE of claim 1, the operations further comprising:
receiving from the communication network a plurality of MOs identifying measurement resources transmitted by the communication network on a plurality of carrier frequencies within the frequency range, wherein the measurement resources in each of the plurality of MOs are linked to only one of the plurality of concurrent MGPs.

9. The UE of claim 1, the operations further comprising:
receiving from the communication network a plurality of MOs identifying measurement resources transmitted by the communication network on a plurality of carrier frequencies within the frequency range, wherein a delay in measuring the measurement resources depends on a number of the carrier frequencies carrying the measurement resources sharing the linked MGP.

10. The UE of claim 1, wherein the measurement resources transmitted by the communication network comprise synchronization signals on broadcast channel or reference signal resources, wherein the measurement resources are periodically transmitted by the communication network.

11. The UE of claim 1, wherein the MO and MGPs are received from the communication network as part of a signaling used for radio resource control.

12. A non-transitory computer-readable storage medium, comprising instructions that, when executed by one or more processors of a user equipment (UE), cause the UE to perform operations comprising:
receiving from a communication network a measurement object (MO) that identifies measurement resources transmitted by the communication network on a carrier frequency within a frequency range;
receiving from the communication network measurement gap configuration parameters that provide a plurality of concurrent measurement gap patterns (MGPs) to measure the measurement resources;
determining, based on an information element comprised in the MO, a linkage between the measurement resources on the carrier frequency and a linked MGP selected from the plurality of concurrent MGPs, wherein the information element associates the measurement resources on the carrier frequency with the linked MGP; and
measuring the measurement resources received from the communication network on the carrier frequency using the linked MGP.

13. A non-transitory computer-readable storage medium, comprising instructions that, when executed by one or more processors of a base station of a communication network, cause the base station to perform operations comprising:
transmitting to a wireless user equipment (UE) of the communication network a measurement object (MO) identifying measurement resources transmitted by the communication network on a carrier frequency within a frequency range;
transmitting to the UE measurement gap configuration parameters providing a plurality of concurrent measurement gap patterns (MGPs) by the UE to measure the measurement resources, wherein the MO comprises an information element that associates the measurement resources on the carrier frequency with a linked MGP selected from the plurality of concurrent MGPs; and
transmitting the measurement resources on the carrier frequency using the linked MGP to allow the UE to measure the measurement resources using the linked MGP.

14. The non-transitory computer-readable storage medium of claim 13, wherein linked MGP is a current state of the plurality of concurrent MGPs provided by the measurement gap configuration parameters when the MO is transmitted to the UE.

15. The non-transitory computer-readable storage medium of claim 13, wherein the information element identifies the linked MGP among the plurality of concurrent MGPs.

16. The non-transitory computer-readable storage medium of claim 15, wherein each of the plurality of concurrent MGPs comprises identification information that uniquely identifies the plurality of concurrent MGPs.

* * * * *